United States Patent [19]

Jinnai

[11] Patent Number: 4,521,789

[45] Date of Patent: Jun. 4, 1985

[54] INK VISCOSITY REGULATION FOR INK JET PRINTER

[75] Inventor: Koichiro Jinnai, Kawasaki, Japan

[73] Assignee: Ricoh Company, Ltd., Tokyo, Japan

[21] Appl. No.: 509,491

[22] Filed: Jun. 30, 1983

[30] Foreign Application Priority Data

Jul. 5, 1982 [JP] Japan ............................... 57-116642

[51] Int. Cl.$^{3}$ ............................................ G01D 15/18

[52] U.S. Cl. .................................. 346/140 R; 346/75

[58] Field of Search ....................... 346/1.1, 75, 140 R

[56] References Cited

U.S. PATENT DOCUMENTS 4,241,406 12/1980 Kennedy et al. ............... 364/518 X
4,301,459 11/1981 Isayama et al. ................ 346/140 R
4,310,846 1/1982 Horike ................................ 346/75
4,337,468 6/1982 Mizuno ........................... 346/1.1 X

*Primary Examiner*—E. A. Goldberg
*Assistant Examiner*—Preston Gerald E.
*Attorney, Agent, or Firm*—David G. Alexander

[57] ABSTRACT

An ink viscosity regulation apparatus for an ink jet printer is disclosed which controls the viscosity of ink to a value which lies within a range appropriate for printing. A signal commanding a supply of diluent into the ink is generated when a predetermined voltage level is exceeded by specific one of voltage levels for driving an electrostrictive vibrator of a head which causes a droplet to be separated from an ink stream at the shortest distance from the head.

3 Claims, 5 Drawing Figures

INK VISCOSITY REGULATION FOR INK JET PRINTER

BACKGROUND OF THE INVENTION

The present invention relates to an ink jet printer with an ink ejection head in which an electrostrictive vibrator is mounted to be driven to eject ink and separate a droplet therefrom. More particularly, the present invention relates to an ink viscosity regulation apparatus which, when a predetermined voltage level is exceeded by a vibrator drive voltage level which separates a droplet from the ejected ink at the shortest distance from the head, supplies a diluent to the ink to thereby control the ink to an appropriate viscosity.

In a known type of ink jet printer, ink inside a head is effected by an electrostrictive vibrator or the like to be ejected from a head and separated into a string of droplets. This type of ink jet printer has a problem that undesirable microscopic ink droplets, generally called "satellites", are produced independently of expected droplets depending upon the distance for separation. The development of satellites is related with various parameters such as the drive voltage, i.e., nozzle drive amplitude, and the pressure and temperature of ink. Because the satellites disturb data reproduction on a recording medium, it is a requisite to set up a nonsatellite or satellite-free range during data reproduction. This in turn requires that the head be actuated by an optimum drive voltage and that the ink be properly diluted to have an adequate viscosity. The dilution is to compensate for an increase in viscosity which generally occurs during circulation of the ink due to evaporation of water and entails the liability of satellites due to the resulting change in the distance for ink separation.

SUMMARY OF THE INVENTION

It is therefore an object of the present invention to provide an ink jet printer capable of printing out data desirably on a recording medium.

It is another object of the present invention to provide an ink viscosity regulation apparatus for an ink jet printer which optimumly controls the viscosity of ink to make the distance for ink separation shortest.

It is another object of the present invention to provide a generally improved ink viscosity regulation apparatus for an ink jet printer.

An ink viscosity regulation apparatus embodying the present invention is applicable to an ink jet printer in which an electrostrictive vibrator is driven to eject ink from a nozzle of a head so that the ink is separated into a droplet to print out a dot on a recording medium. The apparatus comprises means for varying a drive voltage applied to the vibrator, means for detecting a specific level of the drive voltage at which the droplet is separated from the ink at a shortest distance, and means for comparing the detected drive voltage with a predetermined reference voltage level and, when the detected level is higher than the reference level, generating a command signal for diluting the ink and, when the detected level is lower than the reference level, generating a command signal for causing the ink to keep a viscosity thereof unchanged.

The above and other objects, features and advantages of the present invention will become apparent from the following detailed description taken with the accompanying drawings.

DESCRIPTION OF THE PREFERRED EMBODIMENT

While the ink viscosity regulation apparatus for an ink jet printer of the present invention is susceptible of numerous physical embodiments, depending upon the environment and requirements of use, a substantial number of the herein shown and described embodiment have been made, tested and used, and all have performed in an eminently satisfactory manner.

In order to better understand the present invention, a description of the relationship between the drive of an electrostrictive vibrator and the separation of ink into a droplet will be made first, with particular reference to FIGS. 1 and 2.

Figure 1:
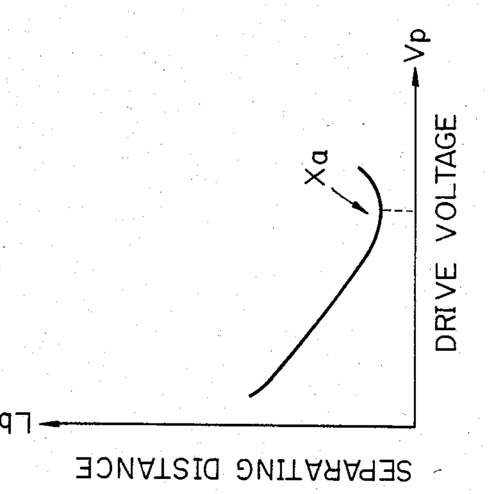
FIG. 1 is a graph showing a relationship between drive voltages applied to an ink ejection head and distances at which a stream of ink separates into a droplet.
Figure 2:
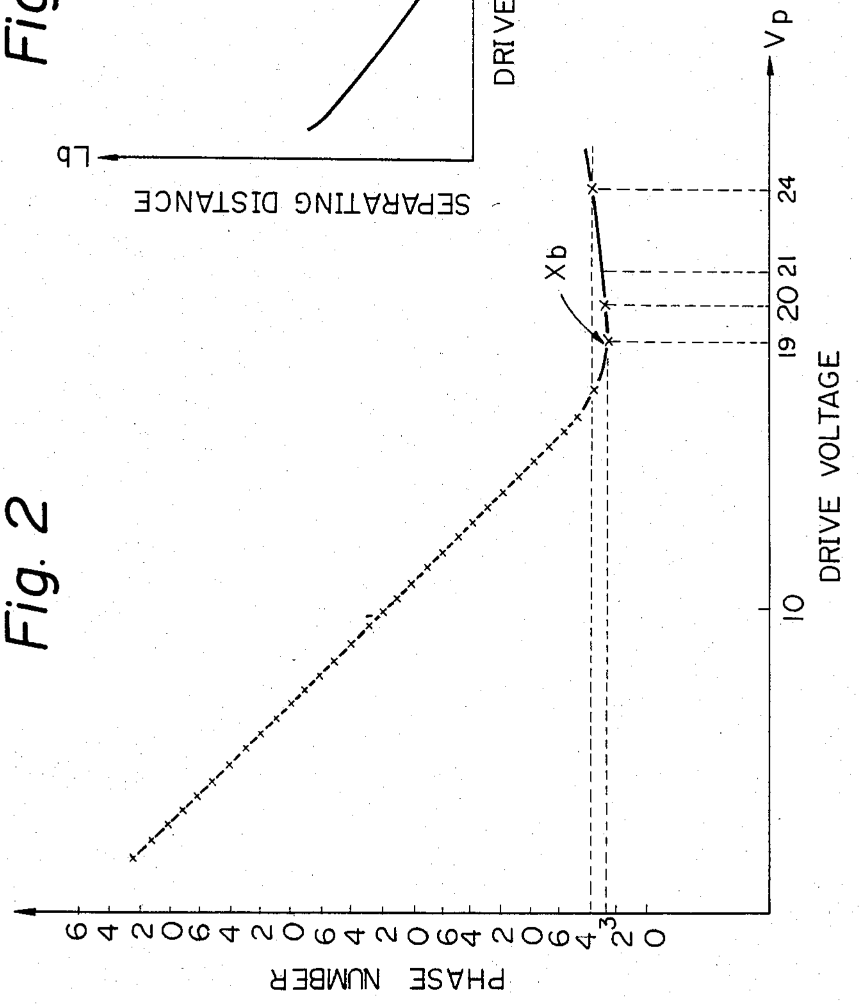
FIG. 2 is a graph showing a relationship between drive voltages and drive phase numbers.

Referring to FIG. 1, the curve shows a relationship between a drive voltage Vp for driving a vibrator in a head and a distance Lb from the head at which a droplet is separated from a stream of ink ejected from the head. Hereinafter, the distance Lb will be referred to as "separating distance" for convenience. As shown, the separating distance Lb progressively decreases as the drive voltage is increased and begins to increase again as soon as the drive voltage reaches a certain level. Supposing that one period of the drive voltage phases, i.e., one period of the amplitudes of the vibrator, is divided into eight sections which are phases #0–#7, a change in the drive voltage will cause the phase number to vary as illustrated in FIG. 2. The graph of FIG. 2 corresponds to the drive voltage to separating distance characteristic of FIG. 1 and was obtained by varying the drive voltage Vp to search a phase and plotting each point where the drive voltage is changed by one phase. As shown in FIG. 2, the change in the phase becomes slower and the phase number smaller in response to an increase in the drive voltage Vp. After the phase change has become slowest relative to the voltage change, the phase number begins to increase again in accordance with a farther elevation of the drive voltage Vp. That is, a point Xa in FIG. 1 where the separating distance Lb is shortest and a flection point Xb in FIG. 2 of the phase numbers are coincident with each other, defining a nonsatellite range which is free from satellites. Even if the head is changed, the drive voltage to phase number and drive voltage to separating distance characteristics will hold the illustrated curves although the drive voltage will change a little.

Figure 3:
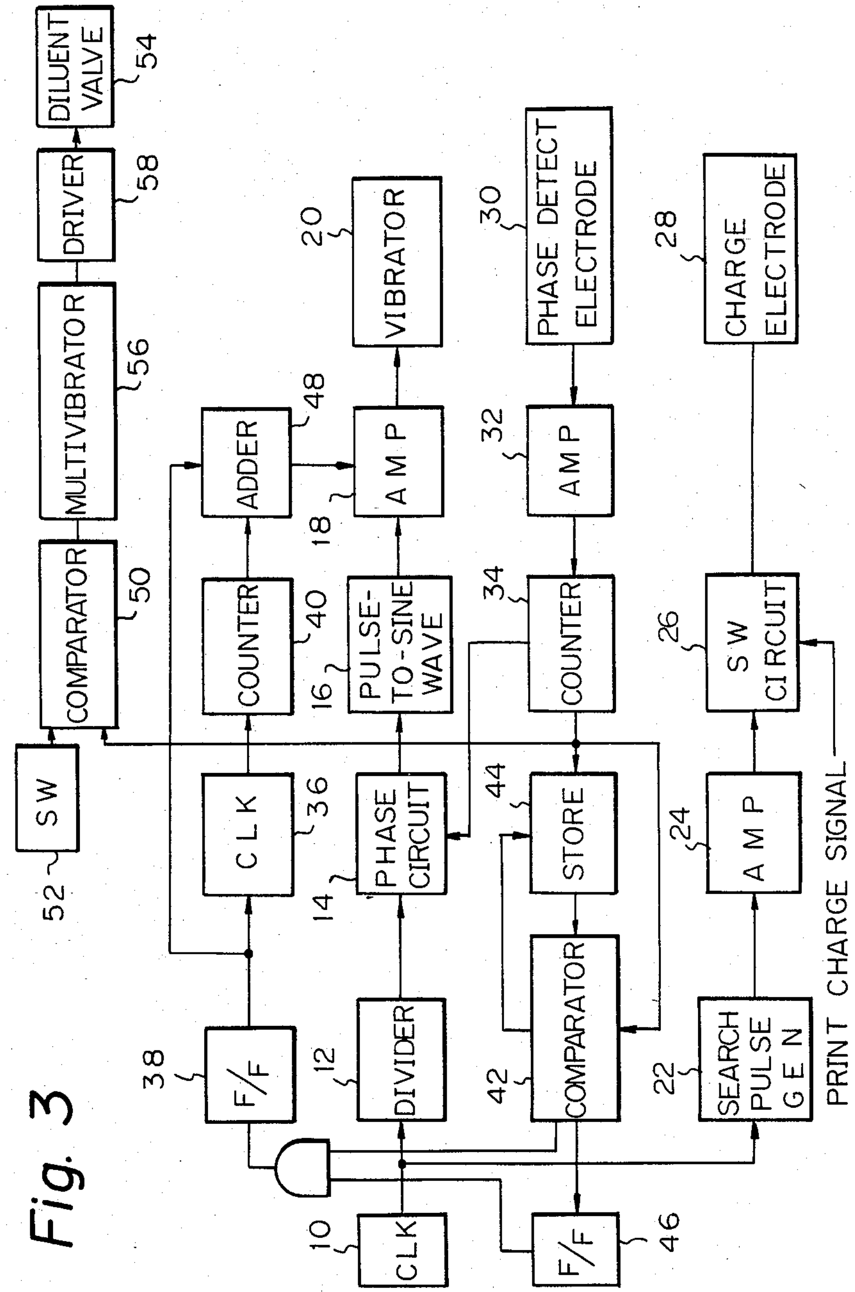
FIG. 3 is a block diagram of an ink viscosity regulation apparatus of the present invention.

Referring now to FIG. 3, there is shown in block diagram an ink viscosity regulation apparatus embodying the present invention which automatically sets an optimum drive voltage and adequately regulates ink viscosity under the optimum drive condition.

In FIG. 3, the apparatus includes a clock generator 10 which is connected to a frequency divider 12. The output of the frequency divider 12 is fed to a phase circuit 14 an output of which is in turn fed to a pulse-to-sine wave converter 16. The output of the converter 16 is delivered through an amplifier 18 to a vibrator 20 in an ink ejection head, thereby serving as a drive signal. The output of the clock generator 10 is also fed to a search pulse generator 22 which then supplies a charge electrode 28 with a phase search pulse via an amplifier 24. A switching circuit 26 intervenes between the amplifier 24 and the charge electrode 28 to selectively pass a print charge signal to the charge electrode 28 therethrough. A phase detect electrode 30 delivers its detection output to an amplifier 32 which is connected to a counter 34. If the detection output of the phase detect electrode 30 is absent, the counter 34 is incremented and an increment signal thereof is supplied to the phase circuit 14 to shift the drive signal to the vibrator 20 by one phase.

Thus, a content of the counter 34 represents a specific phase number of the drive signal at which a droplet is separated from the ink stream from the head upon the generation of a search pulse. A clock generator 36 is a 100 Hz oscillator controlled by a flip-flop 38. The arrangement is such that a counter 40 is incremented at a leading edge of a clock pulse output from the generator 36 to alter the amplification of the amplifier 18 with its output, thereby varying the voltage of the drive signal one volt at a time within the range of 10–40 V. Suppose that the content of the counter 40 is "0" and thereby the output of the amplifier 18 is 10 V. Then, if the output of the phase detect electrode 30 is logical "0", the counter 34 will be incremented causing the phase circuit 14 to shift the drive signal by one phase. This procedure will be repeated thereafter until the output of the phase detect electrode 30 becomes logical "1". In response to a logical "1" output of the electrode 30, the incrementing action of the counter 34 is stopped and a comparator 42 compares the then existing count of the counter 34 with data stored in advance in a storage 44. If the former is noncoincident with the latter, it will be stored in the storage 44 replacing the other. In FIG. 2, when the drive voltage is 19 V, for example, the content of the counter 34 will be "3" and so will be the content of the storage 44. In that case, the counter 40 is incremented at a leading edge of an output of the clock 36 to vary the amplification of the amplifier 18 so that the drive voltage is changed from 19 V to 20 V. It will be clear from FIG. 2 that a detection output of the phase detect electrode 30 appears at the phase #3 when the drive voltage is 20 V as when 19 V. The count of the counter 34, therefore, coincides with the data stored in the storage 44 whereby the comparator 42 delivers a coincidence output, which causes the flip-flop 46 and storage 44 to hold the value "3" individually. Upon the increase of the drive voltage from 20 V to 21 V, another detection output and thereby another coincidence output appears. When the drive voltage reaches 24 V after the repetition of such a procedure, a detection output from the electrode 30 will be obtained at the phase #4. Then, comparing the content of the counter 34 with that of the storage 44, the comparator 42 shows that the former has become larger than the latter for the first time. The output from the comparator 42 sets the flip-flop 38, stops the output of the clock 36 and causes the counter 40 to hold its content. At the same time, an adder 48 is supplied with a 6's complement from the flip-flop 38 which decrements the counter 40 by "6", the drive signal being thus automatically set at about 19 V. In this manner, a drive voltage is automatically specified so that an adequate range for droplet separation may be set up. A comparator 50 compares a count of the counter 34 with a value which is preselected by a switch 52. If the former is larger than the latter, the comparator 50 will supply a diluent supply command to a diluent valve 54 via monostable multivibrator 56 and a driver 58, thereby diluting the ink with a supply of diluent. This will be repeated to control the ink constantly to a proper viscosity.

In summary, it will be seen that the present invention provides an ink viscosity regulation apparatus which controls a drive voltage for a vibrator to an optimum level at which the separation distance of ink into a droplet is shortest and, also, properly regulates the ink viscosity under the optimum drive condition, thereby permitting separation of ink into a droplet to occur in the satellite-free condition and in the appropriate drop forming range. This insures quality data reproduction with a minimum of changes against the lapse of time.

Figure 4:
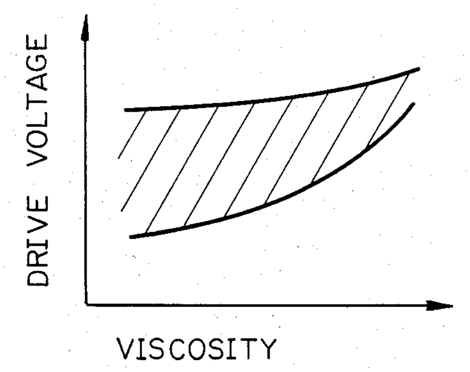
FIG. 4 is a graph indicating an adequate range of drive voltages relative to viscosities.

FIG. 4 is a plot showing an adequate range of drive voltages relative to a viscosity. As shown, the drive voltage range for adequate separation decreases with the increase in ink viscosity.

Figure 5:
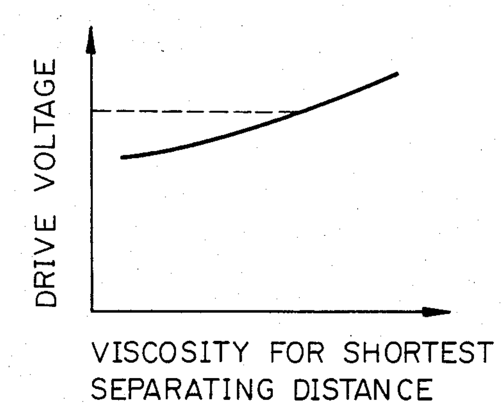
FIG. 5 is a graph showing drive voltages and viscosities at a point where the distance for ink separation is shortest.

FIG. 5 demonstrates a relationship between a viscosity at a point where the separating distance is shortest (Lb mm), i.e., flectional point of phase, and a drive voltage. Designing the switch 52 of FIG. 3 to have the value indicated by a dashed line in FIG. 5 will cause the ink viscosity to be always controlled to a value therebelow.

Various modifications will become possible for those skilled in the art after receiving the teachings of the present disclosure without departing from the scope thereof.

What is claimed is:

1. An ink viscosity regulation apparatus for an ink jet printer in which an electrostrictive vibrator is driven to eject ink from a nozzle of a head so that the ink is separated into a droplet to print out a dot on a recording medium, said apparatus comprising:
   - means for varying a drive voltage applied to the vibrator;
   - means for detecting a specific level of the drive voltage at which the droplet is separated from the ink at a shortest distance; and
   - means for comparing said detected drive voltage level with a predetermined reference voltage level and, when the detected level is higher than the reference level, generating a command signal for diluting the ink and, when the detected level is lower than the reference level, generating a command signal for causing the ink to keep a viscosity thereof unchanged.

2. An apparatus as claimed in claim 1, in which the voltage level detecting means comprises a search pulse generator, a charge electrode and a phase detect electrode.

3. An apparatus as claimed in claim 1, in which the command signal generating means comprises a reference voltage level generator and a comparator.

* * * * *